(12) United States Patent
Wolf

(10) Patent No.: US 8,926,186 B2
(45) Date of Patent: Jan. 6, 2015

(54) ROLLING-ELEMENT BEARING ASSEMBLY HAVING A RETAINING DEVICE

(75) Inventor: Thomas Wolf, Schweinfurt (DE)

(73) Assignee: Aktiebolaget SKF, Gothenburg (SE)

( * ) Notice: Subject to any disclaimer, the term of this patent is extended or adjusted under 35 U.S.C. 154(b) by 52 days.

(21) Appl. No.: 13/811,312

(22) PCT Filed: Jul. 21, 2011

(86) PCT No.: PCT/EP2011/062516
§ 371 (c)(1),
(2), (4) Date: Mar. 21, 2013

(87) PCT Pub. No.: WO2012/010656
PCT Pub. Date: Jan. 26, 2012

(65) Prior Publication Data
US 2013/0266248 A1    Oct. 10, 2013

(30) Foreign Application Priority Data

Jul. 23, 2010 (DE) .......................... 10 2010 038 305

(51) Int. Cl.
| | |
|---|---|
| *F16C 19/49* | (2006.01) |
| *F16C 19/54* | (2006.01) |
| *F16C 33/58* | (2006.01) |
| *F16C 33/60* | (2006.01) |
| *F16C 33/80* | (2006.01) |
| *F16C 41/04* | (2006.01) |
| *F16C 35/077* | (2006.01) |

(52) U.S. Cl.
CPC ................. *F16C 19/49* (2013.01); *F16C 19/54* (2013.01); *F16C 33/58* (2013.01); *F16C 33/60* (2013.01); *F16C 33/80* (2013.01); *F16C 41/04* (2013.01); *F16C 35/077* (2013.01); *F16C 2300/34* (2013.01); *F16C 2361/61* (2013.01)
USPC ............ 384/499; 384/454; 384/515; 384/494

(58) Field of Classification Search
USPC ......... 384/452–455, 499, 502, 504, 515, 609, 384/613, 617, 494
See application file for complete search history.

(56) References Cited

U.S. PATENT DOCUMENTS

| | | |
|---|---|---|
| 1,997,920 A | 7/1911 | Keiper |
| 1,068,017 A | 7/1913 | Stuebner |
| 1,202,876 A | 10/1916 | Moore |
| 1,877,486 A | 9/1932 | Brownlee |
| 2,074,182 A * | 3/1937 | Heim ............................. 384/494 |
| 2,241,032 A | 5/1941 | Horrocks |
| 2,581,722 A | 1/1952 | Simmons |
| 3,733,109 A | 5/1973 | Hallerback |

FOREIGN PATENT DOCUMENTS

| | | |
|---|---|---|
| DE | 1901913 U | 10/1964 |
| DE | 6930530 U | 12/1969 |

(Continued)

*Primary Examiner* — Thomas R. Hannon
(74) *Attorney, Agent, or Firm* — Bryan Peckjian; SKF USA Inc. Patent Department

(57) ABSTRACT

A rolling-element bearing assembly includes an inner ring, an outer ring and a plurality of rolling elements disposed between the inner ring and the outer ring on a common pitch circle diameter. A retaining device is attached to one of the inner ring and the outer ring and holds the rolling-element bearing assembly together without falling apart. The rolling elements include balls and rollers disposed on the common pitch circle diameter in an alternating manner. Further, at least one of the inner ring and the outer ring includes a raceway groove that axially supports the roller bearing balls.

20 Claims, 5 Drawing Sheets

(56) References Cited

FOREIGN PATENT DOCUMENTS

| | | |
|---|---|---|
| DE | 2122845 A1 | 11/1971 |
| DE | 2304389 A1 | 8/1973 |
| DE | 102006044802 A1 | 3/2008 |
| DE | 102007004716 A1 | 8/2008 |
| FR | 1083678 A | 1/1955 |
| GB | 961563 A | 6/1964 |
| WO | WO9015936 A1 | 12/1990 |

* cited by examiner

ROLLING-ELEMENT BEARING ASSEMBLY HAVING A RETAINING DEVICE

CROSS-REFERENCE

This application is the U.S. National Stage of International Application No. PCT/EP2011/062516 filed on Jul. 21, 2011, which claims priority to German patent application no. 10 2010 038 305.8 filed on Jul. 23, 2010.

TECHNICAL FIELD

The invention relates to a rolling-element bearing assembly, having an inner ring and an outer ring, as well as an arrangement of rolling elements introduced between the inner ring and outer ring on a common pitch circle, wherein the arrangement of the rolling elements is formed of roller bearing balls and roller bearing rollers alternatingly disposed on the common pitch circle diameter, and at least one of the inner ring and the outer ring includes a raceway groove for axially supporting the roller bearing balls.

BACKGROUND ART

A combined thrust- and axial rolling element bearing is disclosed in DE-OS 23 04 389. The bearing includes an annular inner race having an L-shaped cross-section, which forms a cylindrical outer bearing surface and a bearing surface disposed at a right angle thereto. An oppositely-oriented outer race is disposed around the race, which outer race also has an L-shaped cross-section, and defines a cylindrical outer bearing surface as well as a bearing surface which is disposed at a right angle to the bearing surface and opposes it. An annular arrangement of rollers and balls alternating with one another is provided between the bearing rings. The rollers have slightly larger diameters than the balls, and are disposed with their axes parallel to the bearing surfaces, so that they respectively form an axial and roller rolling-element bearing between these two surfaces. The axial length of the rollers is slightly smaller than the diameter of the balls, so that the latter are able to transmit axial forces between the bearing surfaces, and thus act as thrust rolling-element bearings.

SUMMARY OF THE INVENTION

In one aspect of the present teachings, an improved rolling-element bearing assembly, in particular with regard to handling, is disclosed.

In another aspect of the present teachings, a rolling-element bearing assembly, includes an inner ring and an outer ring, as well as an arrangement of rolling elements disposed between the inner ring and the outer ring on a common pitch circle diameter, wherein the arrangement of the rolling elements is comprised of roller bearing balls and roller bearing rollers alternatingly disposed on the common pitch circle diameter, and at least one of the inner ring and outer ring includes a raceway groove for axially supporting the roller bearing balls, and wherein at least one of the inner ring and the outer ring includes a retaining device, by which the rolling-element bearing assembly is held together without falling apart.

For example, in standard deep groove ball bearings, the rolling-element bearing assembly of the inner ring, the outer ring, the roller bearing balls and a rolling-element bearing cage is held together as a structural unit by inserting the roller bearing balls between two raceway grooves in the inner ring and the outer ring and by holding them equally spaced apart by the rolling-element bearing cage. By engaging the roller bearing balls in the opposing raceway grooves of the inner ring and outer ring and holding them by the rolling-element bearing cage, a structural unit results that can no longer fall apart.

The situation is different in rolling-element bearing assemblies which include an arrangement of rolling elements, which is comprised of roller bearing balls and roller bearing rollers alternatingly disposed on a common pitch circle diameter. In these or similar rolling-element bearing assemblies, a rolling-element bearing cage can be omitted or should optionally not be present. In particular, however not exclusively in these rolling-element-bearing-cage-free rolling-element bearing assemblies, it is sometimes not possible to ensure that the rolling-element bearing assembly will hold together. There is the danger that an assembly of the inner ring, outer ring and rolling elements can fall apart. The danger of such a falling-apart exists in particular during the transport and/or the installation of the rolling-element bearing assembly. According to the invention a retaining device is therefore proposed for such rolling-element bearing assemblies. The inner ring, outer ring and the rolling elements are held together by this retaining device without falling apart. One single holding device, or two or more retaining devices can alternatively be provided. Each retaining device can be attached either to the inner ring or to the outer ring. With respect to the other bearing ring, the retaining device is freely rotatable in the direction of rotation of the rolling-element bearing assembly, so that rotation of the rolling-element bearing is not disrupted and/or the other bearing ring is not braked by the retaining device.

The at least one of the inner ring and outer ring can include a first leg having an axially-extending, circular-cylindrical outer wall that carries a raceway for the rolling bearing rollers, and includes a second leg having a radially-extending, annular ring wall that carries the raceway groove for the roller bearing balls, and in which rolling-element bearing assembly the retaining device is attached to a ring shoulder of the first or second leg. Both the inner ring and the outer ring can thus each include a radially-extending, annular ring wall. The two ring walls hold the rolling elements together in the rolling-element bearing assembly. In this respect, the ring walls prevent a falling-out of the rolling elements. However, the inner ring and outer ring can be further separated in the axial direction, so that a danger of falling apart exists. In order to prevent this, at least one inventive retaining device is provided, which holds the inner ring and the outer ring together. In one embodiment the retaining device can be attached for this purpose to the inner ring and encompass the outer ring. In an alternative embodiment the retaining device can be attached to the outer ring and encompass the inner ring.

The retaining device can, for example, be pushed onto the ring shoulder using a fitting seat. The retaining device can in particular be pressed onto the ring shoulder using a press-fitting seat. Alternatively, the retaining device can optionally also be adhered.

In all inventive embodiments, the retaining device can be attached to a ring shoulder of the first leg of the outer ring, which first leg carries the raceway for the roller bearing rollers; the retaining device externally encompasses a radial projection of the inner ring. In this embodiment, the retaining device is attached to the outer ring and externally encompasses the inner ring.

In an alternative embodiment, the retaining device can be attached to a ring shoulder of the first leg of the inner ring, which first leg carries the raceway for the roller bearing rollers; the retaining device externally encompasses a radial projection of the outer ring. The alternative embodiment can also be provided in addition to another embodiment as a supplementary retaining device. In this embodiment, the retaining device is attached to the inner ring and externally encompasses the outer ring.

In a modified embodiment, the retaining device can be attached to a ring shoulder of the second leg of the outer ring, which second leg carries the raceway groove for the roller bearing balls; the retaining device externally encompasses a radial projection of the inner ring. The modified embodiment can also be provided in addition to another embodiment as a supplementary retaining device. In this embodiment, the retaining device is attached to the outer ring and externally encompasses the inner ring.

In a further embodiment, the retaining device can be attached to a ring shoulder of the second leg of the inner ring, which second leg carries the raceway groove for the roller bearing balls; the retaining device externally encompasses a radial projection of the outer ring. The further embodiment can also be provided in addition to another embodiment as a supplemental retaining device. In this embodiment, the retaining device is attached to the inner ring and externally encompasses the outer ring.

In all inventive embodiments, the retaining device can include a labyrinth seal. The gap between the inner ring and outer ring, in which for example a rolling-element bearing grease can be introduced, can be sealed off with respect to the outside environment, so that for example no rolling-element bearing grease can escape from the rolling-element bearing assembly and/or no dirt can enter into the rolling-element bearing assembly. To achieve an integration of functions, a seal, in particular a labyrinth seal, can be formed on the retaining device. In particular, the retaining device can be formed in such a way or manufactured from such a material that the retaining device can fulfill a sealing function. In other words, the rolling-element bearing seal is formed by the retaining device.

In all inventive embodiments the retaining device can be formed from a metal-plate ring. The metal plate ring can for example be manufactured by combined cutting and bending.

Alternatively to the embodiment as a metal-plate ring, the retaining device can be formed by a plastic ring. The plastic ring can, for example, be manufactured in an injection molding process. The plastic ring can in particular be manufactured from glass-fiber-reinforced polyamide, such as for example PA 6.6 GF 25.

In all inventive embodiments, the arrangement of roller bearing balls and roller bearing rollers can be guided by direct contact of the roller bearing balls and roller bearing rollers with one another, in particular in a rolling-element-cage-free manner on the same pitch circle diameter. The inventive retaining device can, however, also be applied to rolling-element bearing assemblies having rolling element cages.

The invention also relates to a double row rolling-element bearing assembly including two single row rolling-element bearing assemblies according to one of the previously described embodiments, wherein the two single row rolling-element bearing assemblies are connected to each other at their inner rings and/or outer rings.

In the double row rolling-element bearing assembly, the two single row rolling element bearing assemblies can be connected to each other via the retaining device according to one of the previously described embodiments. Alternatively or additionally, the two single row rolling-element bearing assemblies can be connected to each other via a separate retaining device or a spacing sleeve.

In summary and in other words, a rolling-element bearing, among other things, thus results from the invention, which is suitable as an individual bearing as well as for example as a double row bearing unit for a low-friction and nevertheless rigid support of combined forces. The bearing is comprised, per row, of a defined number of balls and simultaneously of an equally large number of cylindrical rollers. Here the cylindrical rollers preferably only support radial forces, and the balls only axial forces. Both rolling element forms can be located on an identical pitch circle diameter. The sequence of the rolling elements along the pitch circle is an alternating of balls and cylindrical rollers. Preferably, the bearing has no rolling element cage, in particular on the one hand in order to accommodate as many rolling elements as possible on the respective pitch circle, and on the other hand to eliminate sliding friction between the rolling elements and the cage pockets. The guidance of the rolling elements in the circumferential direction can instead result from the contact of the rolling elements with one another.

Since each two adjacent cylindrical rollers are separated by a ball, only a point contact is possible between each two adjacent rolling elements. The sliding friction losses resulting therefrom are hence in any case lower than those of cylindrical roller bearings containing only rollers. The cylindrical rollers can be guided in the radial direction via the raceways of the inner ring and outer ring. The axial guidance of the cylindrical rollers can be achieved by radially-extending legs, which can be realized in the radial section as in particular L-shaped inner rings and outer rings.

The guidance of the balls can be effected radially as well as axially by an axially-encircling groove on the inner ring and/or on the outer ring. A larger-than-square shape of the cylindrical rollers results which is required by a minimum depth of the ball raceways necessary to guide the balls. The cylindrical rollers can each be guided on a guide flange of the inner and outer ring to prevent the rollers from moving crosswise.

The ball diameter is always made smaller than the roller diameter. This is the prerequisite for a clean separation of the radial force support by the cylindrical rollers on the one hand, and the support of the axial force by the balls on the other hand. The difference should, however, be as small as possible and in particular not exceed approximately 0.5 mm.

The pitch circle diameter is to be chosen according to the desired number of roller bearing balls and roller bearing rollers and dependent on their diameters, so that in the assembled state as small as possible of a final clearance results between the rolling elements.

Both the inner ring, which can be connected with a shaft washer, and the outer ring, which can be connected with a housing washer, can be formed L-shaped in the radial section. In the case of an individual bearing, i.e. a single row rolling-element bearing, according to the invention, both rings, i.e. inner ring and outer ring, are held captively together with the rolling element set. This can for example be implemented using a bent metal-plate ring or a plastic ring, which holds the two bearing rings together at an end of their legs. In this way, relative movement occurring in operation between the rings is hindered as little as possible. In addition, the retaining device, i.e. the retaining ring, can be formed with a labyrinth seal. Two individual or single-row rolling-element bearings can be used in combination with a spacing sleeve to increase the torque rigidity, in particular also as an assembled bearing unit. Likewise, the use as a double row bearing without a spacing sleeve can be provided.

A lubrication of the rolling-element bearing assembly can in all cases be effected using an initial lubrication made of grease.

BRIEF DESCRIPTION OF THE DRAWINGS

Exemplary embodiments of the invention are shown in an exemplary manner in the accompanying schematic drawings.

DETAILED DESCRIPTION OF THE INVENTION

Figure 1:
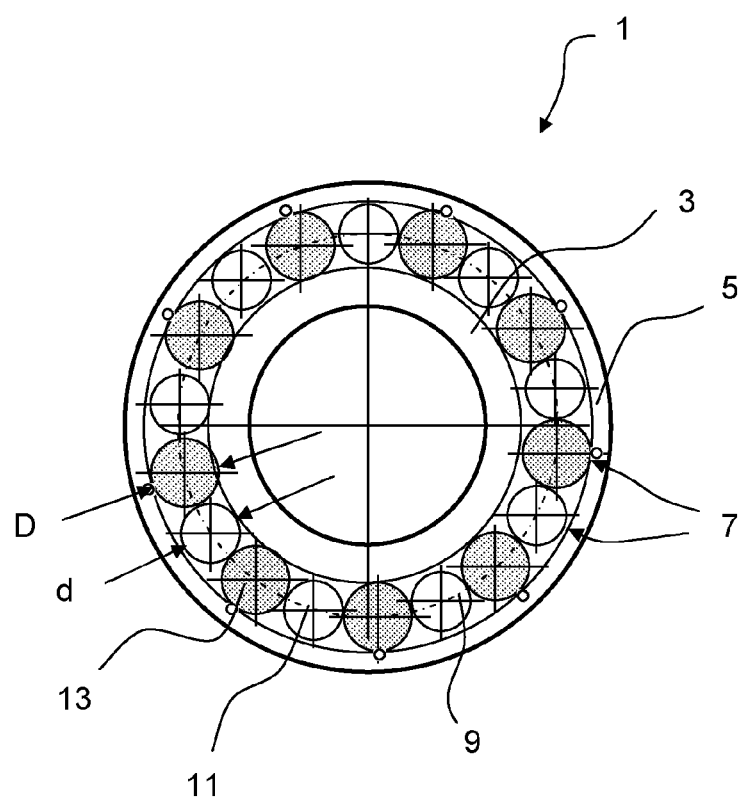
FIG. 1 shows a schematic axial section through a rolling-element bearing assembly having roller bearing balls and roller bearing rollers.

A rolling-element bearing assembly 1 having an inner ring 3 and an outer ring 5 is shown in FIG. 1. Rolling elements 7 are disposed between the inner ring 3 and the outer ring 5. All rolling elements 7 lie on the same pitch circle diameter 9. The arrangement of rolling elements 7 is formed from roller bearing balls 11 and roller bearing rollers 13 alternatingly disposed on the pitch circle diameter 9. The diameters d of the roller bearing balls 11 are slightly smaller than the diameters D of the roller bearing rollers 13, so that radial forces acting on the rolling-element bearing assembly 1 are conducted away via the roller bearing rollers 13.

Figure 2:
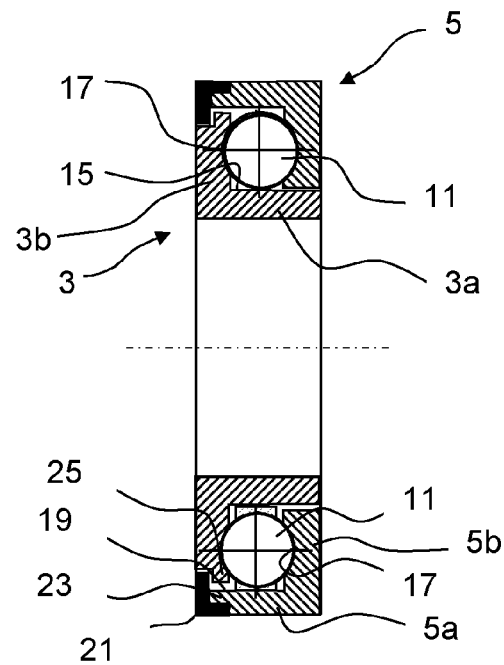
FIG. 2 shows a cross-sectional view of the rolling-element bearing assembly according to FIG. 1 having an inventive retaining device.

FIG. 2 shows the rolling-element bearing assembly 1 in a cross-sectional view in bent cut path through two roller bearing balls 11.

In the illustrated embodiment, the inner ring 3 includes a first leg 3a having an axially-extending, circular-cylindrical outer wall, which carries an inner raceway 15 for the roller bearing rollers 13. Furthermore, the inner ring 3 includes a second leg 3b having a radially-extending, annular ring wall, which carries a raceway groove 17 for the roller bearing balls 11.

In an analogous manner, the outer ring 5 includes a first leg 5a having an axially-extending, circular-cylindrical inner wall, which carries an outer raceway 19 for the roller bearing rollers 13. A second leg 5b of the outer ring 5 includes a radially-extending, annular ring wall, which carries a second raceway groove 17 for the roller bearing balls 11.

The rolling-element bearing assembly 1 is held together without falling apart by a retaining device 21. In the illustrated embodiment, the retaining device 21 is attached to a ring shoulder 23 of the first leg 5a of the outer ring 5. To hold the rolling-element bearing assembly 1 together without falling apart, the retaining device 21 attached to the ring shoulder 23 of the first leg 5a of the outer ring 5 encompasses a radial projection 25 of the inner ring 3. In the exemplary embodiment shown, the retaining device 21 is formed by a ring having an L-shaped cross section. The retaining device 21 can for example be formed as a metal-plate ring or plastic ring.

Figure 3:
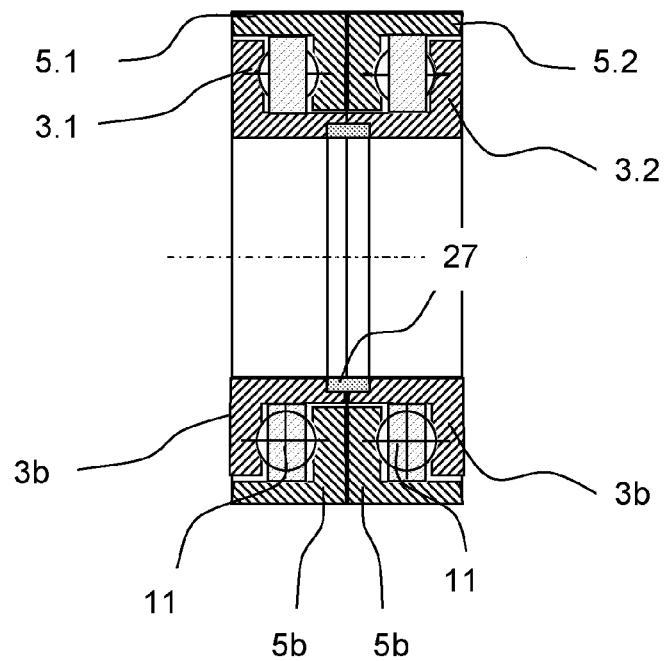
FIG. 3 shows a cross-sectional view of a first embodiment of a double row rolling-element bearing assembly.

FIG. 3 shows a double row rolling-element bearing assembly, which comprises two single row rolling-element bearing assemblies 1. In the illustrated exemplary embodiment, the two single row rolling-element bearing assemblies 1 are connected to each other at their inner rings 3.1 and 3.2 using a separate retaining device 27. The two outer rings 5.1 and 5.2 may be held together by a modified retaining device (not shown) via the two first legs 3a and second legs 3b of the inner rings 3.1 and 3.2, the roller bearing balls 11, as well as via the two second legs 5b of the outer rings 5.1 and 5.2.

Figure 4:
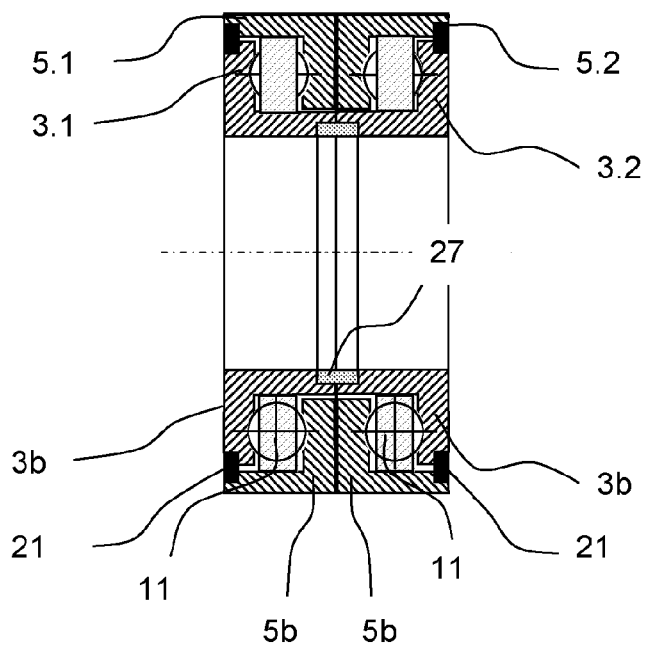
FIG. 4 shows a cross-sectional view of a second embodiment of a double row rolling-element bearing assembly.

FIG. 4 shows a modified double row rolling-element bearing assembly which is formed from two single row rolling element bearing assemblies 1. In the illustrated exemplary embodiment, the two single-row rolling-element bearing assemblies 1 are connected to each other at their inner rings 3.1 and 3.2 via a separate retaining device 27. The two outer rings 5.1 and 5.2 are held together by the separate retaining device 27 via the two first legs 3a and second legs 3b of the inner rings 3.1 and 3.2, the roller bearing balls 11, as well as via the two second legs 5b of the outer rings 5.1 and 5.2. Moreover, each single row rolling-element bearing assembly 1 is separately secured without falling apart by its own retaining device 21.

Figure 5:
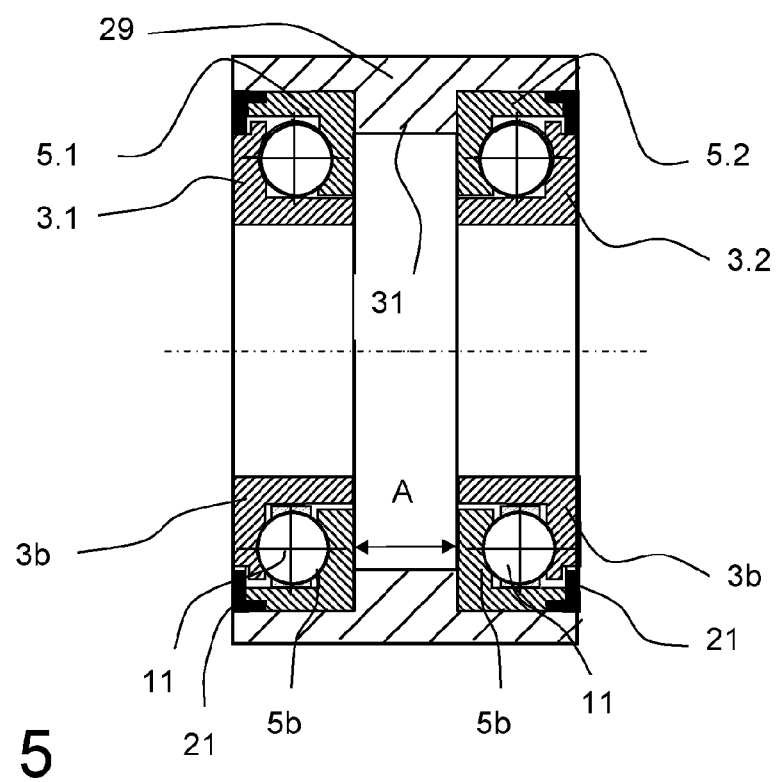
FIG. 5 shows a cross sectional view of an embodiment of two single row rolling-element bearing assemblies having a spacing sleeve.

FIG. 5 shows an embodiment of two single row rolling element bearing assemblies 1 having a spacing sleeve 29. The spacing sleeve 29 connects the two outer rings 5 at a defined spacing A, which is predetermined by an inner encircling ring shoulder 31. The inner encircling ring shoulder 31 is formed on an inner wall surface of the spacing sleeve 29.

Figure 6:
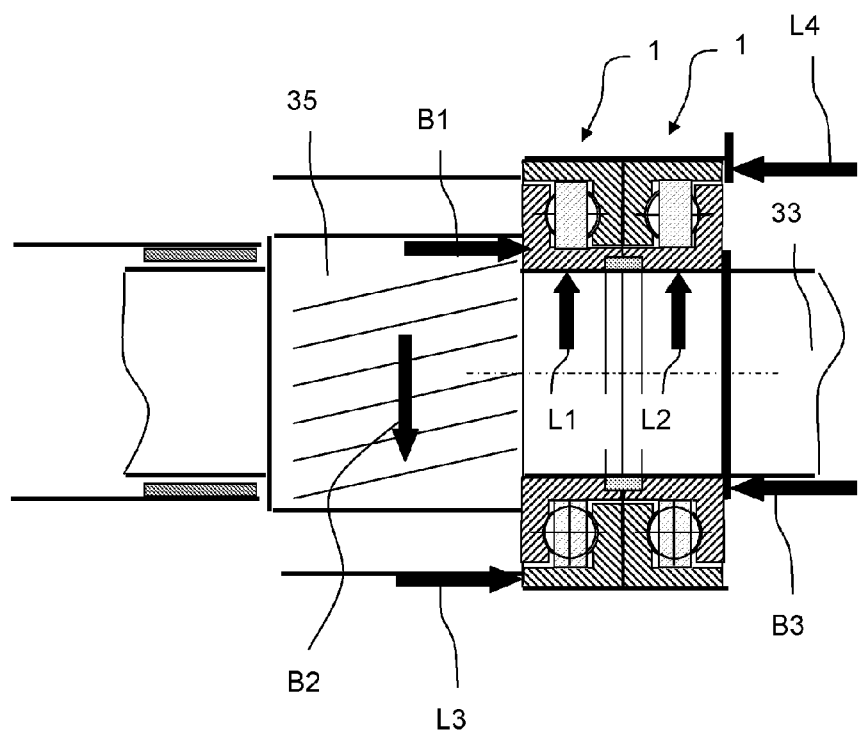
FIG. 6 shows a schematic cross-sectional view of an installation situation as an example of a gear shaft having a double row rolling element bearing assembly.

An installation situation as an example of a gear shaft 33 having a double row rolling-element bearing assembly is illustrated in FIG. 6. The double row rolling-element bearing assembly comprises two single row rolling-element bearing assemblies 1. The gear shaft 33 is connected by way of example to a helical driving gear or driven gear 35. Alternatingly occurring operating forces are indicated schematically using arrows B1, B2 and B3. Bearing reaction forces, which occur and act on the double row rolling-element bearing assembly, are indicated schematically using arrows L1, L2, L3, and L4. All inventive rolling-element bearing assemblies 1 are universally usable for combined loads. The inventive rolling-element bearing assembly 1 can in particular be used with vertical shaft assemblies.

Figure 7:
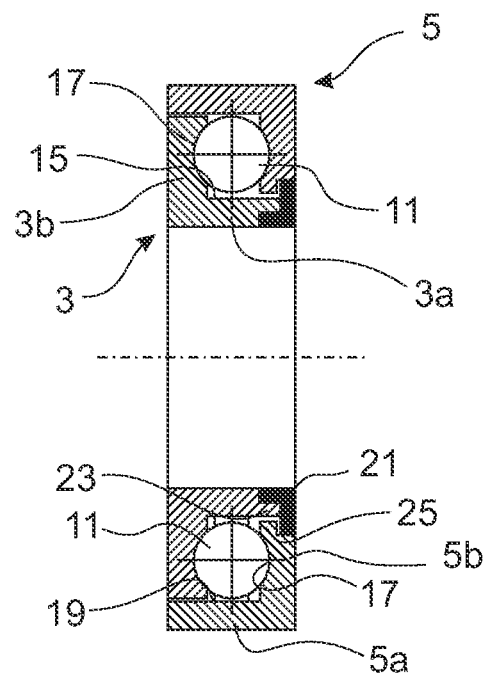
FIG. 7 shows a cross-sectional view of an embodiment of a rolling-element bearing assembly including a retaining device attached to a ring shoulder of the first leg of the inner ring.

FIG. 7 shows an alternate embodiment that is similar to the rolling-element bearing assembly 1 in a cross-sectional view in bent cut path through two roller bearing balls 11. The embodiment presented in FIG. 7 differs from the embodiment presented in FIG. 2 in that the retaining device 21 is attached to a ring shoulder 23 of the first leg 3a of the inner ring 3.

Figure 8:
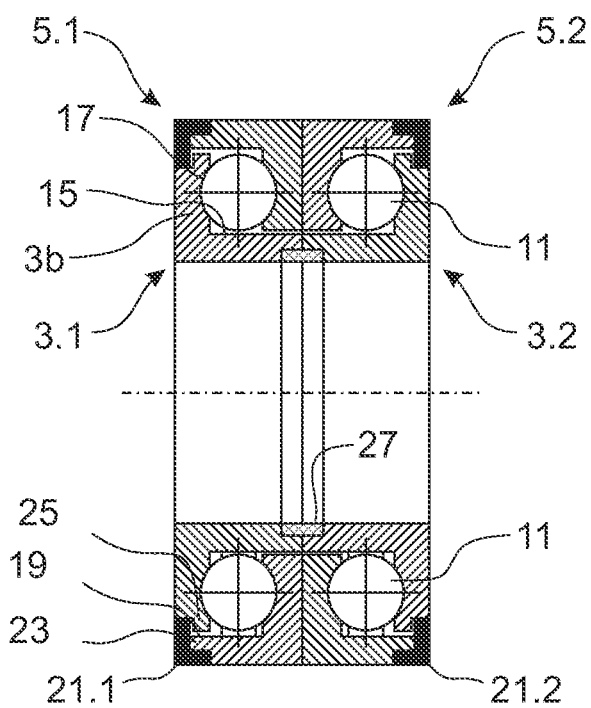
FIG. 8 shows a cross-sectional view of a pair of single row rolling-element bearing assemblies, each single row rolling-element bearing assembly having a retaining device, wherein the pair of single row rolling-element bearing assemblies are joined together by a separate retaining device forming a double row rolling-element bearing assembly.

FIG. 8 is similar to FIG. 3, wherein FIG. 8 shows a double row rolling-element bearing assembly, which comprises two single row rolling-element bearing assemblies. In the illustrated exemplary embodiment, the two single row rolling-element bearing assemblies are connected to each other at their inner rings 3.1 and 3.2 using a separate retaining device 27. The two outer rings 5.1 and 5.2 are held together by a retaining device 21.1, 21.2 attached to a ring shoulder of the first legs 3a of the inner rings 3.1 and 3.2, the roller bearing balls 11, as well as via the two second legs 5b of the outer rings 5.1 and 5.2.

REFERENCE NUMBER LIST

1 Rolling-element bearing assembly
3, 3.1, 3.2 Inner ring 5, 5.1, 5.2 Outer ring
3a, 5a First leg
3b, 5b Second leg
7 Rolling elements
9 Pitch circle diameter
11 Roller bearing balls
13 Roller bearing rollers
15 Raceway
17 Raceway groove
19 Raceway
21, 21.1, 21.2 Retaining device
23 Ring shoulder
25 Radial projection
27 Separate retaining device
29 Spacing sleeve
31 Inner encircling ring shoulder
33 Gear shaft
35 Driving gear or driven gear
B1-B3 Operating forces
L1-L4 Bearing reaction forces

The invention claimed is:

1. A rolling-element bearing assembly, comprising:
an inner ring,
an outer ring,
a plurality of rolling elements disposed on a common pitch circle diameter between the inner ring and the outer ring, and
a retaining device attached to one of the inner ring and the outer ring and holding the rolling-element bearing assembly together without falling apart,
wherein the rolling elements comprise balls and rollers disposed on the common pitch circle diameter in an alternating manner, and
at least one of the inner ring and the outer ring includes a raceway groove that axially supports the roller bearing balls,
wherein the retaining device is attached in one of the following configurations:
(a) the retaining device is attached to the inner ring and axially encompasses at least a portion of the outer ring, and
(b) the retaining device is attached to the outer ring and axially encompasses at least a portion of the inner ring.

2. The rolling-element bearing assembly according to claim 1, wherein the retaining device is attached to the inner ring and axially encompasses at least a portion of the outer ring.

3. The rolling-element bearing assembly according to claim 1, wherein the retaining device is attached to the outer ring and axially encompasses at least a portion of the inner ring.

4. The rolling-element bearing assembly according to claim 1, wherein at least one of the inner ring and the outer ring includes:
a first leg having an axially-extending, circular-cylindrical wall that carries a raceway for the rollers, and
a second leg having a radially-extending, annular ring wall that carries the raceway groove for the balls,
wherein the retaining device is attached to a ring shoulder of the first leg or the second leg.

5. The rolling-element bearing assembly according to claim 4, wherein the retaining device is press-fit onto the ring shoulder.

6. The rolling-element bearing assembly according to claim 1, wherein the balls and rollers are guided by direct contact of the balls and rollers against one another.

7. The rolling-element bearing assembly according to claim 6, wherein the assembly contains no rolling-element cage.

8. The rolling-element bearing assembly according to claim 1, wherein the retaining device comprises a ring having an L-shaped cross-section.

9. A double row rolling-element bearing assembly, comprising:
two single row rolling-element bearing assemblies according to claim 1, wherein the two single row rolling-element bearing assemblies are connected to each other at their inner rings and/or at their outer rings.

10. The double row rolling-element bearing assembly according to claim 9, further comprising a separate retaining device or a spacing sleeve that connects the two single row rolling-element bearing assemblies.

11. The rolling-element bearing assembly, comprising:
an inner ring,
an outer ring,
a plurality of rolling elements disposed on a common pitch circle diameter between the inner ring and the outer ring, and
a retaining device attached to one of the inner ring and the outer ring and holding the rolling-element bearing assembly together without falling apart,
wherein the rolling elements comprise balls and rollers disposed on the common pitch circle diameter in an alternating manner;
at least one of the inner ring and the outer ring includes a raceway groove that axially supports the roller bearing balls;
wherein the outer ring includes:
a first leg having an axially-extending, circular-cylindrical wall that carries a raceway for the rollers, and
a second leg having a radially-extending, annular ring wall that carries the raceway groove for the balls,
wherein the retaining device is attached to a ring shoulder of the first leg and the retaining device axially encompasses a radial projection defined on the inner ring.

12. The rolling-element bearing assembly according to claim 11, wherein the inner ring includes:
a first leg having an axially-extending, circular-cylindrical wall that carries a raceway for the rollers, and
a second leg having a radially-extending, annular ring wall that carries the raceway groove for the balls,
wherein the balls are axially contained by the raceway grooves of the inner ring and the outer ring.

13. The rolling-element bearing assembly according to claim 12, wherein each of the inner ring and the outer ring has an L-shaped cross-section.

14. The rolling-element bearing assembly according to claim 13, wherein the rollers are cylindrical rollers.

15. The rolling-element bearing assembly according to claim 14, wherein the balls have a first diameter and the cylindrical rollers have a second diameter, the first diameter being smaller than the second diameter.

16. The rolling-element bearing assembly according to claim 15, wherein the retaining device is press-fit onto the ring shoulder of the outer ring.

17. The rolling-element bearing assembly according to claim 16, wherein:
the balls and rollers are guided by direct contact of the balls and rollers against one another, and
the assembly contains no rolling-element cage.

18. A double row rolling-element bearing assembly, comprising:
two single row rolling-element bearing assemblies according to claim 17, wherein the two single row rolling-element bearing assemblies are connected to each other at their inner rings and/or at their outer rings.

19. The double row rolling-element bearing assembly according to claim 18, further comprising a separate retaining device or a spacing sleeve that connects the two single row rolling-element bearing assemblies.

20. The rolling-element bearing assembly, comprising:
an inner ring,
an outer ring,
a plurality of rolling elements disposed on a common pitch circle diameter between the inner ring and the outer ring, and
a retaining device attached to one of the inner ring and the outer ring and holding the rolling-element bearing assembly together without falling apart,
wherein the rolling elements comprise balls and rollers disposed on the common pitch circle diameter in an alternating manner;
at least one of the inner ring and the outer ring includes a raceway groove that axially supports the roller bearing balls;
wherein the inner ring includes:
a first leg having an axially-extending, circular-cylindrical wall that carries a raceway for the rollers, and
a second leg having a radially-extending, annular ring wall that carries the raceway groove for the balls,
wherein the retaining device is attached to a ring shoulder of the first leg and the retaining device axially encompasses a portion of the outer ring.

* * * * *